United States Patent [19]

Al Ghatta

[11] Patent Number: 5,374,690
[45] Date of Patent: Dec. 20, 1994

[54] BLOCK COPOLYESTER RESINS

[75] Inventor: Hussain Al Ghatta, Fiuggi, Italy

[73] Assignee: M. & G. Ricerche S.p.A., Pozzilli, Italy

[21] Appl. No.: 949,529

[22] PCT Filed: Mar. 26, 1992

[86] PCT No.: PCT/EP92/00668
§ 371 Date: Dec. 28, 1992
§ 102(e) Date: Dec. 28, 1992

[87] PCT Pub. No.: WO92/17521
PCT Pub. Date: Oct. 15, 1992

[30] Foreign Application Priority Data

Mar. 29, 1991 [IT] Italy .......................... MI91A000886

[51] Int. Cl.⁵ ............................................. C08F 20/00
[52] U.S. Cl. .................................. 525/437; 525/438; 525/439; 525/444; 525/466; 525/533
[58] Field of Search ............... 525/438, 437, 439, 444, 525/466, 533

[56] References Cited

U.S. PATENT DOCUMENTS

| 3,446,778 | 5/1969 | Waller et al. ........................ 260/75 |
| 4,273,890 | 6/1981 | Hirzy ................................. 525/440 |
| 4,382,131 | 5/1983 | Binsack et al. .................... 525/445 |
| 4,598,129 | 7/1986 | Borman et al. .................... 525/439 |
| 4,686,262 | 8/1987 | Binsack et al. .................... 525/445 |
| 4,708,975 | 11/1987 | Shain ................................. 524/94 |
| 4,942,219 | 7/1990 | Yatsuka et al. ................... 525/438 |
| 4,981,908 | 1/1991 | Wolfe, Jr. .......................... 525/174 |

FOREIGN PATENT DOCUMENTS

| 0095189-A2 | 11/1983 | European Pat. Off. ...... C08L 67/04 |
| 0095189-A3 | 11/1983 | European Pat. Off. ...... C08L 67/04 |
| 2210075 | 9/1973 | Germany ..................... C08G 39/10 |

Primary Examiner—Melvyn I. Marquis
Assistant Examiner—Randy Gulakowski
Attorney, Agent, or Firm—Edward D. Manzo; Andrew G. Kolomayets

[57] ABSTRACT

A composition of polyester resins comprising diblock copolymers formed of two different polyester blocks joined by a bifunctional radical deriving from a dianhydride of a tetracarboxylic acid. The compositions are prepared by a reaction in the solid state of two different polyesters in the presence of a dianhydride of a tetracarboxylic acid.

7 Claims, 8 Drawing Sheets

BLOCK COPOLYESTER RESINS

The present invention relates to block copolyester resins and to the method of preparation thereof.

It is known that blends of polyester resins can be prepared by extruding the resins in a mono or twin screw extruder.

The extrusion temperature is not too much higher than the melting point of the polyester and the residence time is the shortest possible to avoid undesired ester interchange reactions (Journ Pol. Sci. Polym Physics Vol. 18, 2299-2301—1980).

The resins do not present properties of practical interest.

The availability of block copolyester containing block selected in function of the desired properties of the end article and upgraded to sufficiently high molecular weight opens the perspective of broad range of applications in any sector from that of the blow molding to the coating, tubing and foaming.

Such copolyesters however are not known.

It has now surprisingly found that it is possible to prepare block copolyesters wherein two different polyester blocks are bounded to an organic radical. The preparation is made by blending in the molten state different polyester resins in the presence of a compound capable of additive reactions with the terminal COOH and OH groups of the polyester, pelletizing the molten product and then subjecting the granules to upgrading reaction in the solid state at temperatures from 100° to 220° C.

The copolyester compositions of this invention comprise block copolymers of formula

X—A—Y in which X and Y are different polyester or copolyester blocks; A is an organic radical, deriving from a bifunctional compound capable of additive reactions with the COOH and OH terminal groups of the polyester.

Preferably A is a radical deriving from a dianhydride of a cycloaliphatic or aromatic tetracarboxylic acid.

Preferably X and Y are block of polyethyleneterephthalate, copolyethyleneterephthalate containing up to 20% by weight of the resin of units deriving form isophthalic acid or from 5-tert-butyl 1.3 benzene dicarboxylic acid.

X or Y may be also blocks from polybutyleneterephthalate, polycyclobenzenedimethylterephthalate, polycaprolactone or polyester elastomers. Preferred are the compositions in which the copolymers contain blocks of polyethyleneterephthalate and copolyethyleneterephthalate.

Depending on the composition of the starting polyester mixture, the block copolymer can be present in different proportion with respect to the polyesters of the starting mixture.

Besides the block copolymer, the compositions may contain also the homopolymer of the starting polyesters.

The upgrading reaction by polyaddition in the solid state comprises a crystallization step after blending the resins with the upgrading additive and pelletization of the resin.

The crystallization step is carried out at temperatures higher than the TG of the polyester and comprised in general between 130° and 180° C.

The process is preferably carried out in continuous way using continuous crystallizers and reactors where the chips are fed counter currently with a stream of a heated gas, e.g. air, nitrogen or other inert gas, such as carbon dioxide.

The upgrading additive is preferably selected from the group consisting of pyromellitic dianhydride, benzophenone dianhydride, 2,2-bis(3,4-dicarboxyphenyl) propane dianhydride, 3,3',4,4'-biphenyltetracarboxylic acid dianhydride, bis(3,4-dicarboxyphenyl) ether dianhydride, bis(3,4-dicarboxyphenyl) thioether dianhydride, bisphenol A bisether dianhydride, 2,2-bis(3,4 dicarboxyphenyl) hexafluoropropane dianhydride, 2,3,6,7-naphthalenetetracarboxylic acid dianhydride, bis(3,4-dicarboxyphenyl) sulfone dianhydride, 1,2,5,6-naphthalenetetracarboxylic acid dianhydride, 2,2',3,3'-biphenyltetracarboxylic acid dianhydride, hydroquinone bisether dianhydride, bis(3,4-dicarboxyphenyl) sulfoxide dianhydride, 3,4,9,10-perylene tetracarboxylic acid dianhydride and mixtures thereof.

The most preferred aromatic dianhydrides are pyromellitic dianhydride and 3,3',4,4' benzophenonetetracarboxylic acid dianhydride and mixtures thereof.

Dianhydrides of aliphatic, cycloaliphatic and tetrahydrofuran tetracarboxylic acids are also suitable.

Representative compounds are 1,2,3,4-cyclobutanetetracarboxylic acid dianhydride and tetrahydrofuran tetracarboxylic acid dianhydride.

The blending of polyester resin with the additive is preferably carried out in an equipment capable to perform reactive extrusion such as corotating or counter rotating intermeshing or not intermeshing twin screw extruder with or without venting at a temperature between 200° and 350° C. depending on the melting point of the copolymer. A counter rotating not intermeshing vented or not vented twin screw extruder is preferred.

The use of such type of extruder allows to perform a good distribution of the dianhydride in the melt and to avoid problems of local high concentrations of the additive.

This type of extruder allows very short residence times.

The extruder may also be fed with polyester granulate produced in another plant.

The extruder is preferably connected with a high vacuum oil seal pump to maintain a vacuum higher than 2 torr for the devolatization of the reactive blend and for obtaining a resin with a low content of acetaldehyde.

The preferred concentration of additive, with respect to the polyester resin, is 0.05-1% by weight.

The residence time in the extruder is comprised between about 10 and 120 sec., preferably 15-30 sec. and the temperature of the melt is related to the copolyester melting point and to the kind of dianhydride used, and it is preferably comprised between 200° C. and 350° C.

To avoid random local concentration of additive in the melt, it is advisable to dilute the additive with crystallized PET powder (1 part of PMDA to 5 parts of PET powder). This procedure will ensure a homogeneous distribution of PMDA in the melt leading to a better reproducibility of the end product intrinsic viscosity and inhibiting gel formation.

The dianhydride may also be diluted using blends of the dianhydride and crystallized PET-chips (1 part additive to 10 parts PET chips).

The blending could be performed in a fanned blender using 0.1% weight of polyethyleneglycol or polycaprolactone, as adhesives, and using blending temperature of about 150° C.

The melt coming out of the twin screw extruder can be continuously pelletized using a commercially available underwater pelletizer system or a strand pelletizer system.

According to another aspect of the invention, the block polyester composition can be added with polymers such as polybutileneterephthalate, polycarbonate, polyester elastomers, phenoxy resins in amount up to about 20% by weight. The addition has the effect of improving the mechanical properties of the composition as well as the processing conditions.

ANALYTICAL PROCEDURES

The intrinsic viscosity was determined by dissolving 0.5 g of polyester in granule in 100 ml of a mixture 60/40 by weight of phenol and tetrachlorethane, operating at 25° C. according to ASTM D 4603-86.

The acetaldehyde content was determined according to ASTM 4526-85 using a PERKIN ELMER 8700 chromatograph (HS 101 model).

The extraction conditions were 150° for 90 min.

The test was carried out according to ASTM D 2463-74.

The following examples are given to illustrate but not to limit the invention.

Comparative Example 1

30 Kg/h random COPET melt (15% isophtalic acid in weight melting point 212° C. IV=0.75 dl/g) having a content of 110 ppm acetaldehyde were fed continuously from the finishing section of PET melt polycondensation pilot plant to a 30 mm twin screw extruder with venting capability 220 g/h of a mixture of 20% weight of pyromellitic acid dianhydride in crystallized COPET powder (IV: 0.75 dl/g, 15% weight isophtalic acid) were fed into the extruder using a gravimetric feeder. The test conditions were as follows:

Pyromellitic acid dianhydride in the COPET melt=0.15% by weight
Screw speed: 415 RPM
Ration length (L/D): 24
Average residence time: 18-25 sec.
Barrel temperature: 235° C.
Product melt temperature: 290° C.
Vacuum: 1-5 torrs.

A die with double holes was used as extruder die (Diameter: 7 mm).

A strand pelletizer was used to obtain the COPET-chips which had a cylindrical shape with a diameter of 3 mm and a length of 5 mm, and with an intrinsic viscosity IV=0.85±0.01 dl/g.

The COPET chips had an acetaldehyde content of 5-8 ppm.

During the test period, the IV of the product was constant over a period of 2 weeks.

The melting point of the product was 212° C. FIG. 1 shows the DSC diagram of this COPET.

The COPET-chips were then fed continuously into a solid state polycondensation pilot plant using the apparatus and the inert gas recycling described in European application EP 86830340.5.

The crystallization temperature was 150° C. and the residence time in the crystallizer was 40 min. The temperature in the solid state polyaddition reactor was 150° C. and the residence time was 12 h.

The IV of the upgraded product was 0.94±0.02 dl/g.

The product was free from gel, with an acetaldehyde content of 0.60 ppm.

EXAMPLE 1

The same conditions as in example 2 were used but instead of COPET alone, mixtures of COPET and Standard PET (IV=0.80 dl/g) were used. The following table shows the results obtained, particularly the IV values after upgrading and DSC curves of different compositions.

| COPET % WEIGHT | STAND. PET % WEIGHT | IV AFTER EXTRUSION | IV AFTER UPGRADING (dl/g) | ACA (ppm) | DSC melt point |
|---|---|---|---|---|---|
| 50 | 50 | 0.845 | 0.914 | 0.70 | FIG. 2 |
| 60 | 40 | 0.85 | 0.919 | 0.68 | FIG. 3 |
| 65 | 35 | 0.867 | 0.923 | 0.57 | FIG. 4 |
| 70 | 30 | 0.853 | 0.918 | 0.61 | FIG. 5 |
| 75 | 25 | 0.850 | 0.918 | 0.61 | FIG. 6 |
| 80 | 20 | 0.846 | 0.920 | 0.61 | FIG. 7 |

ACA=acetaldehyde.

The Curve of FIG. 1 shows a melting point of 210° C. with a delta Hm (melting point hentalpy) of 25.9 J/g;

EXAMPLE 2

The same conditions as in comparative example 1 were used, but 27 Kg/h COPET melt (IV=0.75 dl/g; isophtalic acid 15% in weight) were fed continuously into the twin screw extruder and 3 Kg/h of polybutyleneterephthalate chips (IV=1.2 dl/g) were fed continuously in a separate port in the feeding zone of the twin screw extruder. 220 g/h of a mixture of 20% weight of pyromellitic acid dianhydride in crystallized COPET powder (IV=0.75 dl/g; 0.15% weight isophtalic acid) were fed into the extruder using a gravimetric feeder.

The COPET/PBT chips had an acetaldehyde content of 5-7 ppm.

The IV of the product was 0.86±0.02 dl/g.

Figure 1:
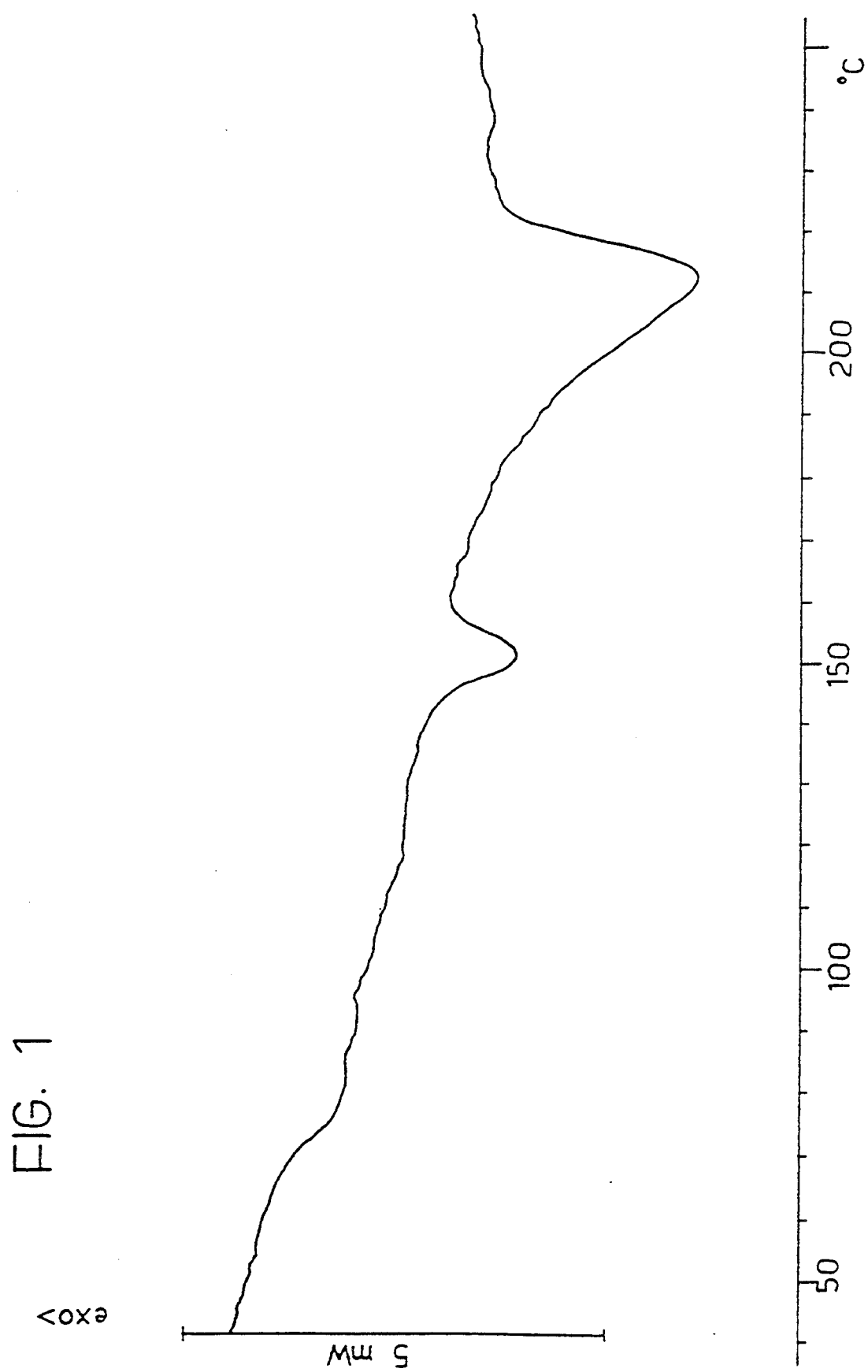
Figure 2:
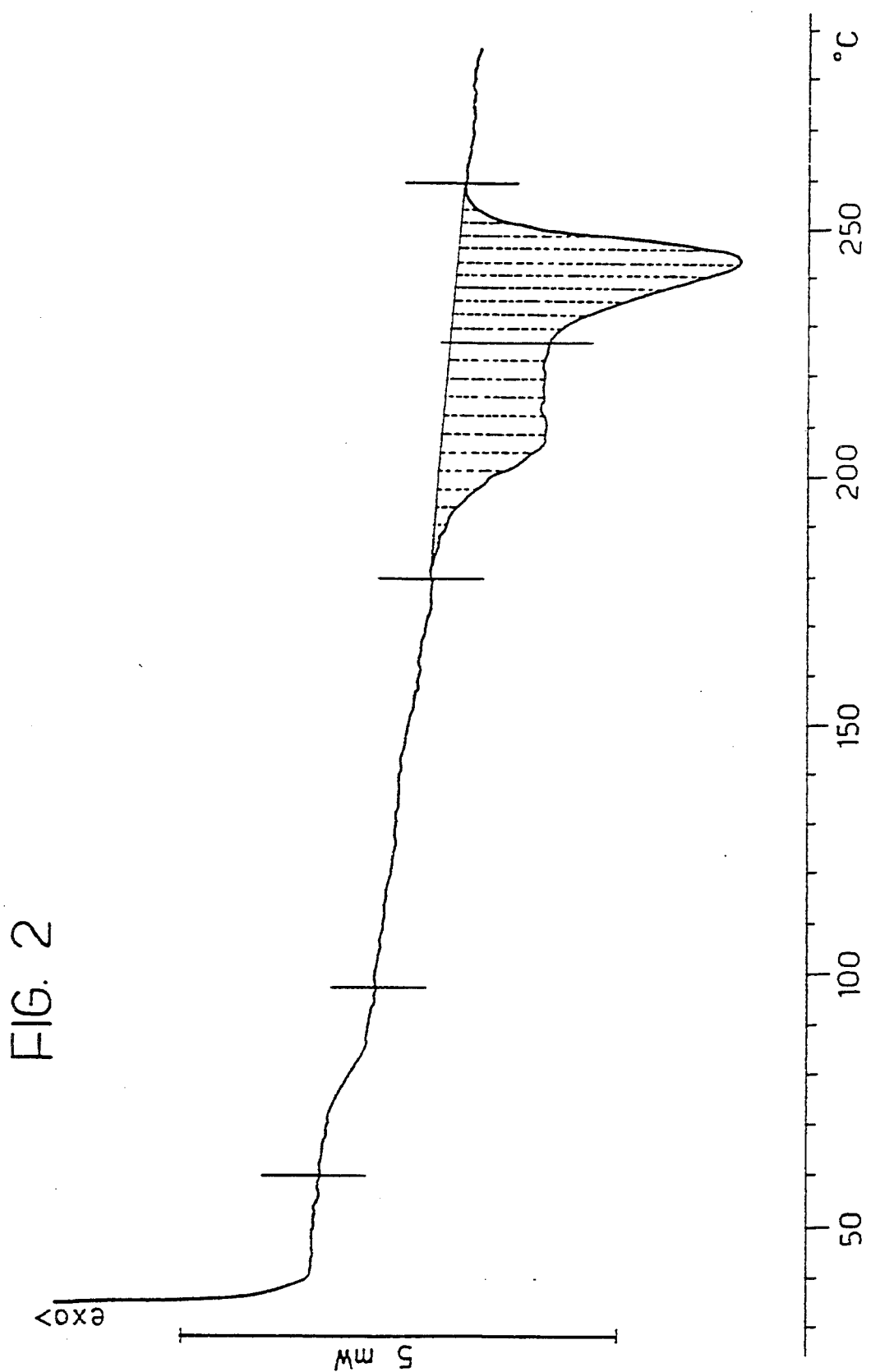
FIG. 2 shows one peak at 243° C. with a delta Hm of 16.5 Jg and a second one at 206° C. with delta Hm of 16.5 J/g.
Figure 3:
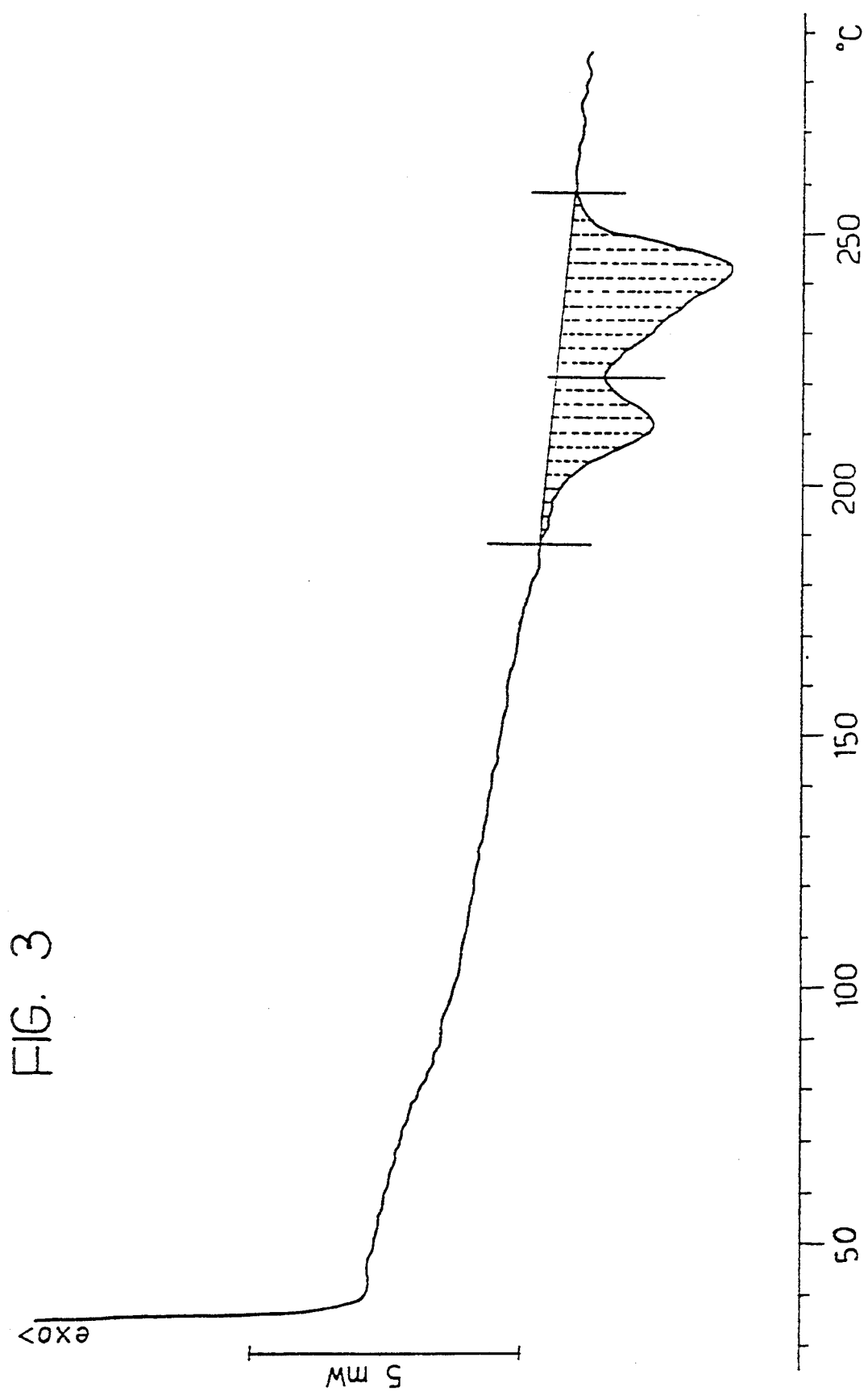
FIG. 3 shows one peak at 241.4° C. with a delta Hm of 27 J/g another one at 210° C. with delta Hm 12.7 J/g.
Figure 4:
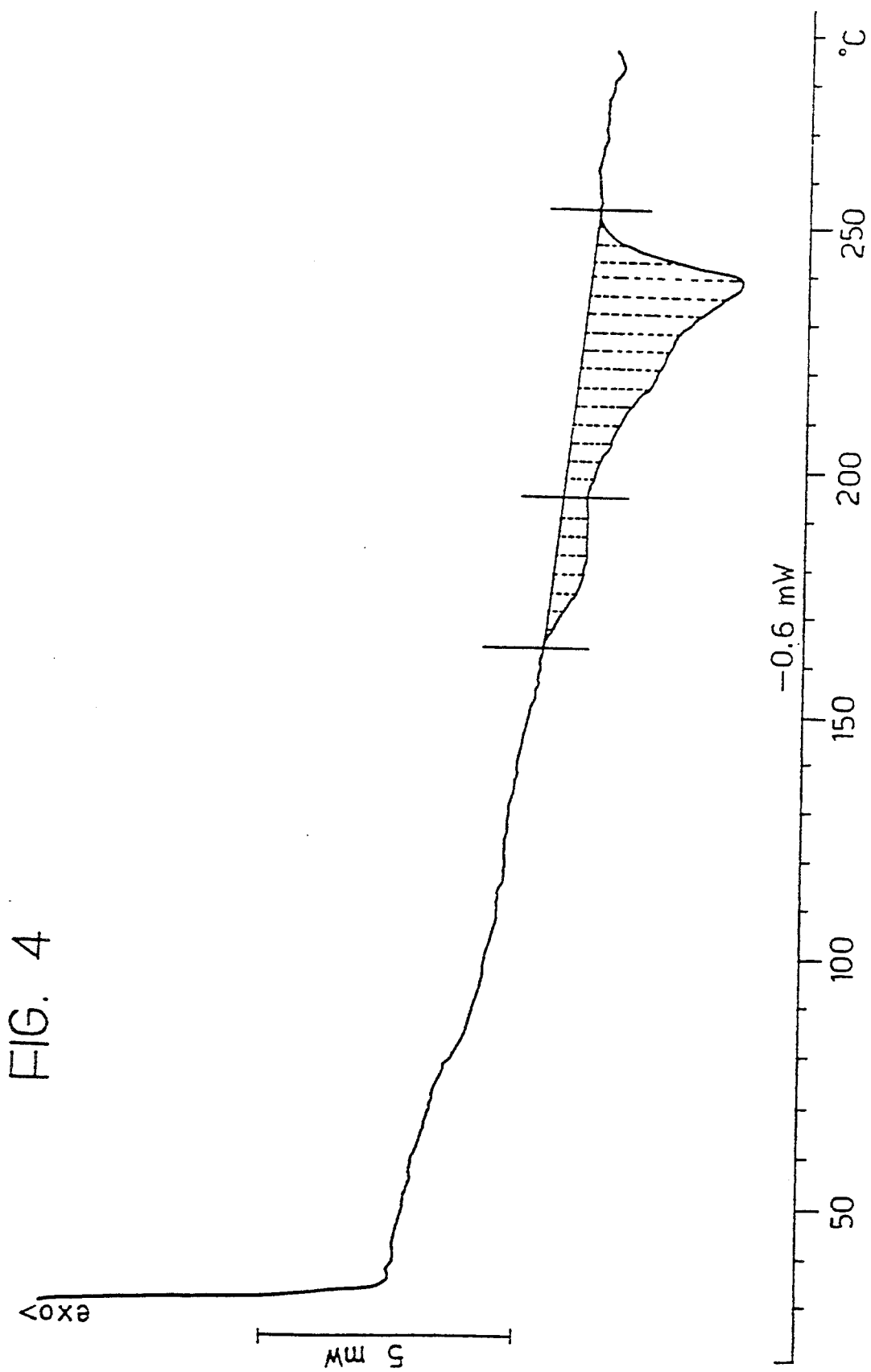
FIG. 4 shows one peak at 236.3° C. with delta Hm of 28.6 J/g and a second one at 180.5° C. with delta Hm of 5.1 J/g.
Figure 5:
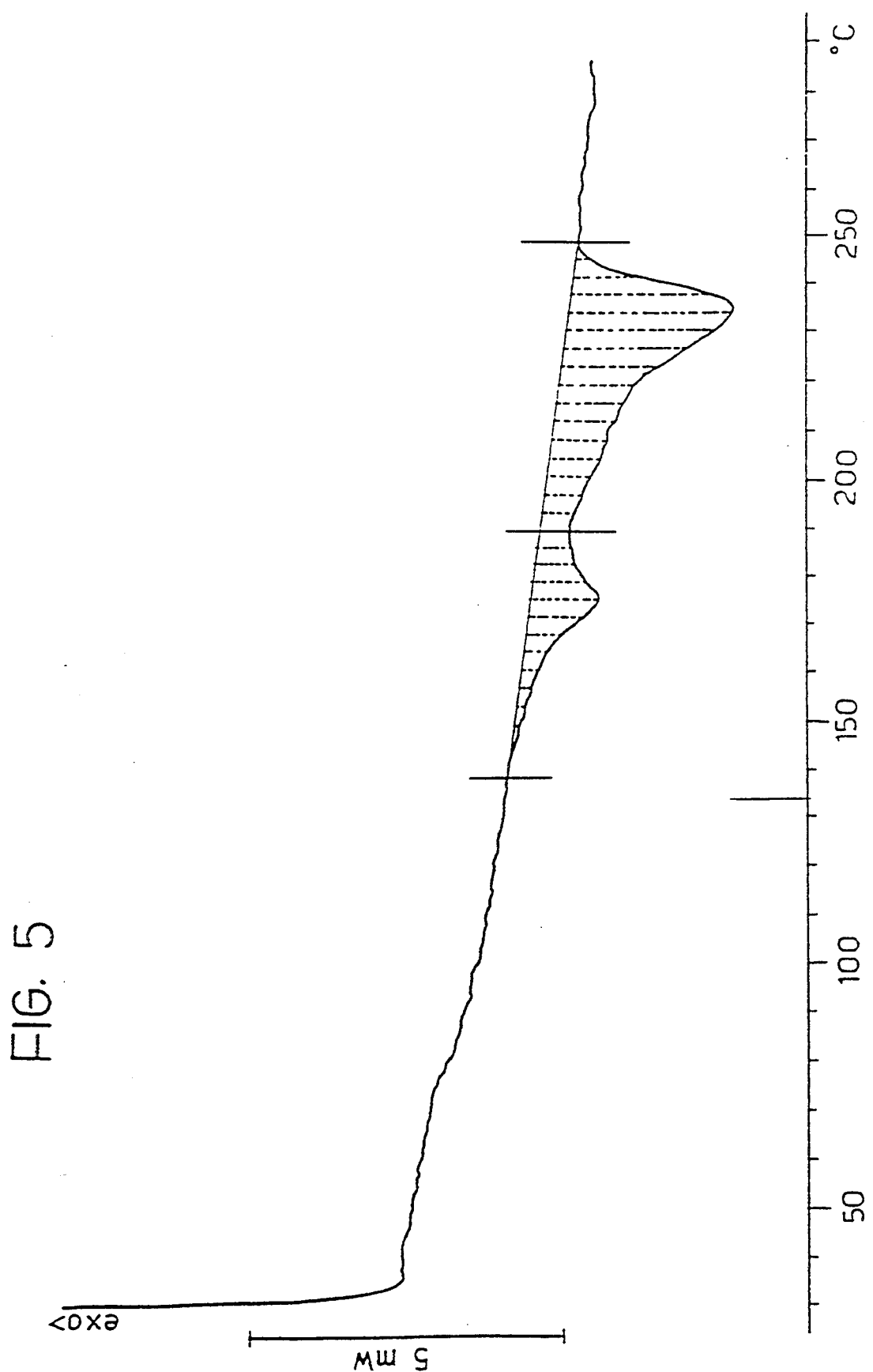
FIG. 5 shows one peak at 233° C. with delta Hm of 30.4 J/g and a second one at 173.7° C. with delta Hm 10 J/g.
Figure 6:
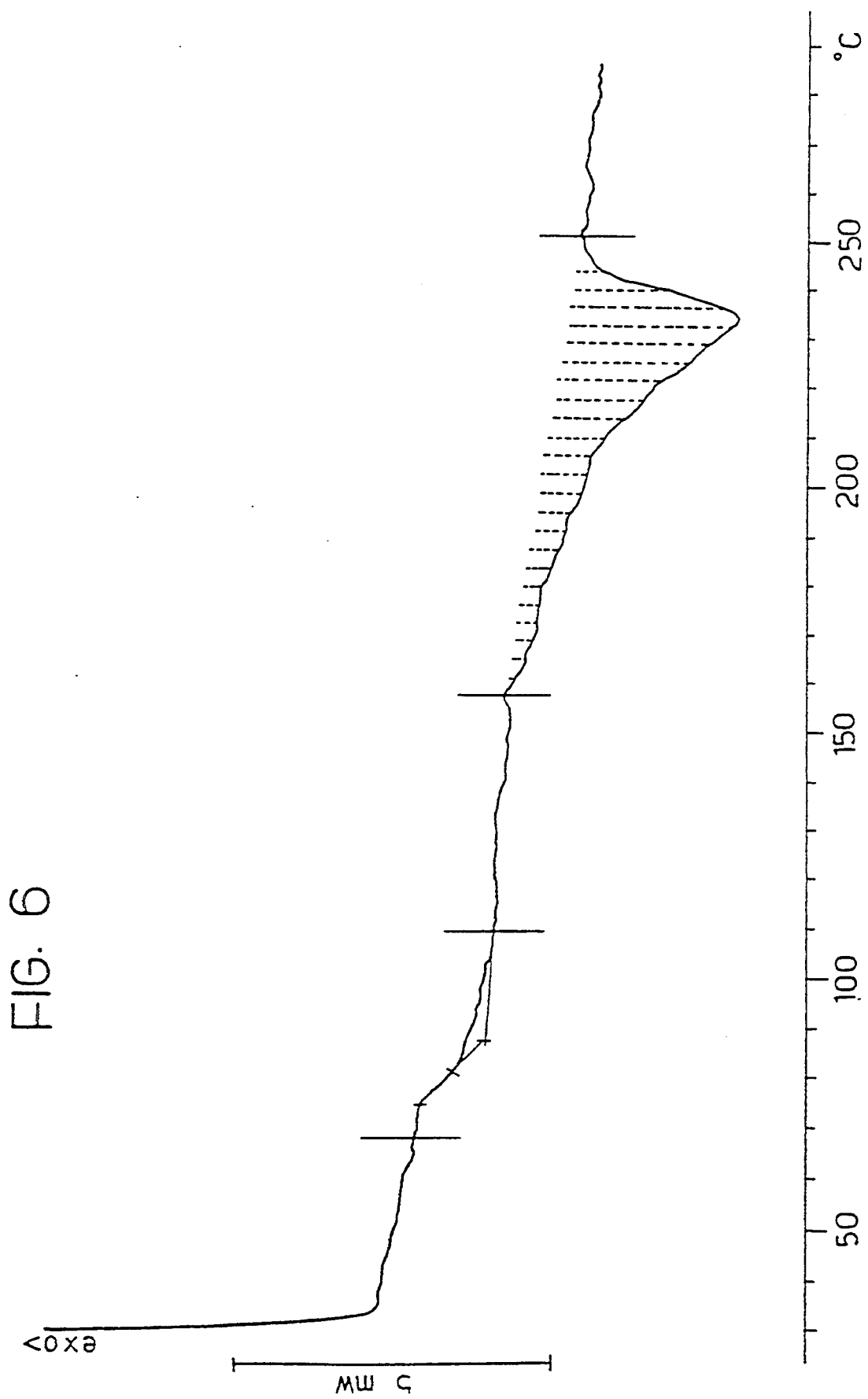
FIG. 6 shows a peak at 233.6° C. with delta Hm of 33.1 J/g.
Figure 7:
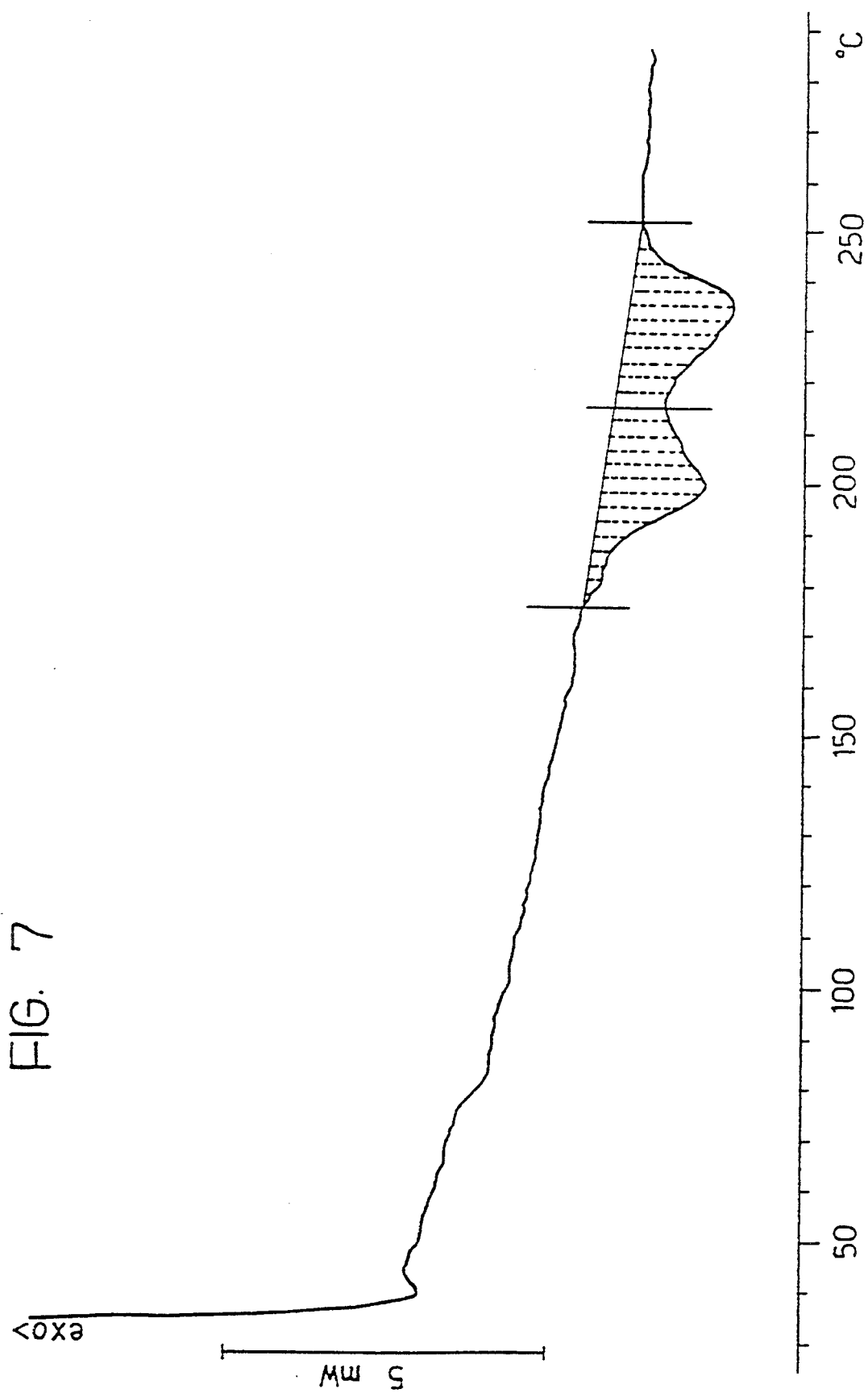
FIG. 7 shows one peak at 234.5° C. with delta Hm 29.3 J/g and a second one at 198.4° C. with delta Hm 17.7 J/g.
Figure 8:
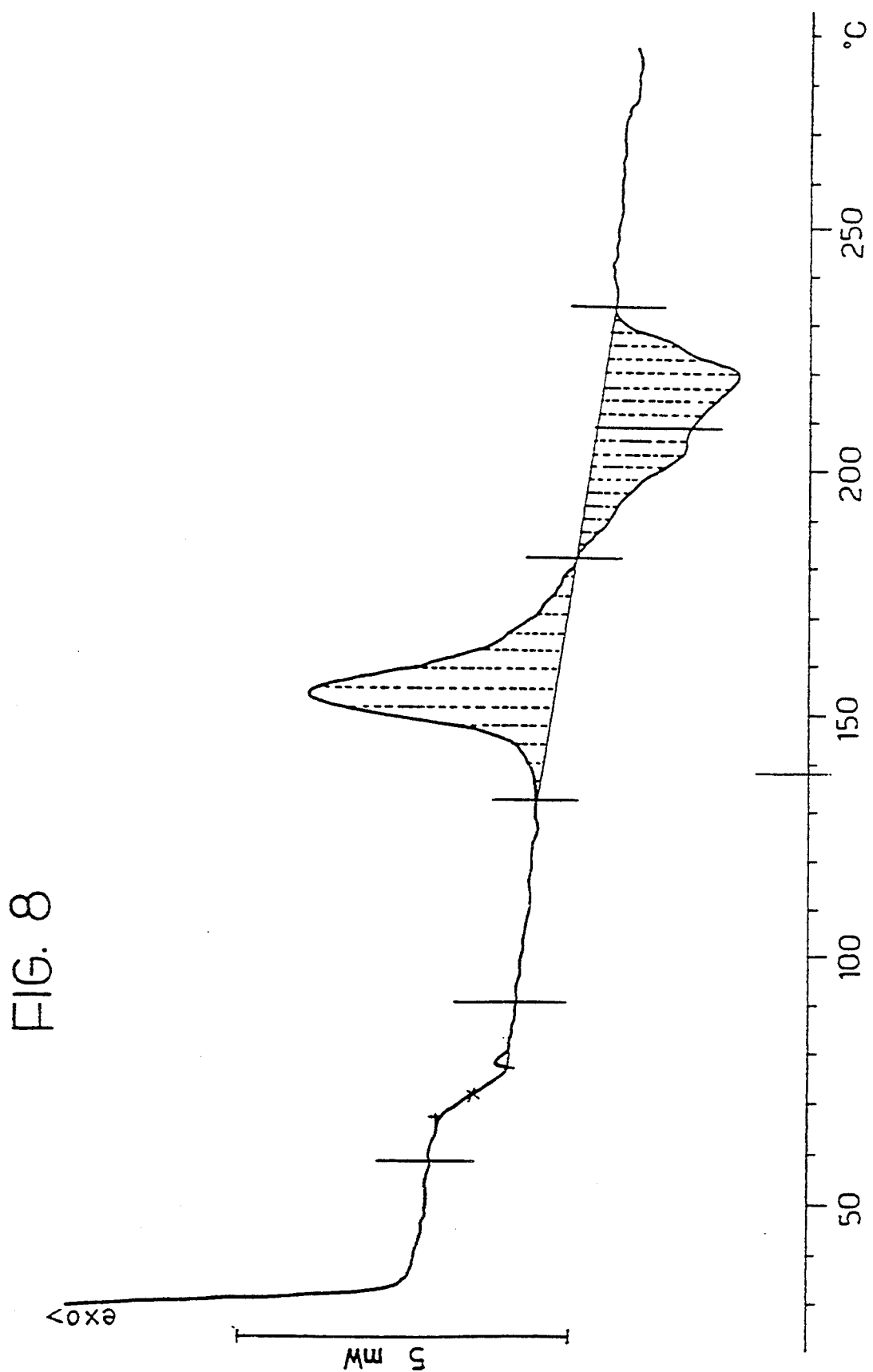

The melting point of the product is shown in FIG. 8.

The COPET/PBT chips were fed continuously into a solid state polyaddition pilot plant under the same conditions as in example 1.

The IV of the upgraded product was 0.95±0.02 dl/g.

The product was free from gel, with an acetaldehyde content of 0.45 ppm.

Comparative Example 2

The following table describes the extrusion below moulding conditions and the apparatus used for production of the bottles up to 1500 ml capacity.

| Mould | rotative distributor/ 2 moulds |
|---|---|
| Head | pet covered mono parison |
| Screw diameter/length | 24 L/D |
| Screw size | 65 mm |
| Screw type | standard pvc |
| Article | round bottle |

| Volume | up to 1500 ml |
|---|---|
| Output | 50.4 Kg/h (depending on the bottle volume) |
| Parison length | up to 40 cm |
| Production | 960 bottles/hour |
| Cycle | 8.0 seconds |
| Temperature | |
| Barrel | 250° C. |
| Die | 290° C. |
| Head | 290° C. |

A good drying of the material is required up to less than 0.005% water using dried air with a Dew point between −30° C. and −40° C.

In this example, the COPET of comparative example 1 was used.

The following table gives the blowing conditions and the results obtained.

| RESIN | BARREL/HEAD DIE TEMP °C. | BOTTLE/HOUR N° | BOTTLE WEIGHT gr | OUTPUT Kg/h | SCREW SPEED rpm | ACA ppm | DROP TEST cm |
|---|---|---|---|---|---|---|---|
| COPET | 230 270 280 | 960 | 42 | 50.4 | 48 | 3.6 | 62 |

EXAMPLES 3–8

These examples describes the extrusion blowing of a block copolymer COPET/PLC. This block copolymer was prepared under the conditions of example 2 but using 15% by weight of polycaprolactone (PLC) instead of PBT.

The following table gives the blowing conditions and the results obtained.

| Examples | Copolymer COPET/PET | Barrel | Head Temp. C.° | Die | N°/h | Bottles weight g | output Kg/h | Screw Speed rpm | ACA ppm | Drop Test cm |
|---|---|---|---|---|---|---|---|---|---|---|
| 3 | 50% 50% | 250 | 280 | 300 | 960 | 42 | 50.4 | 57 | 2.3 | 90 |
| 4 | 60% 40% | 250 | 280 | 300 | 960 | 42 | 50.4 | 56 | 5.2 | 66 |
| 5 | 65% 35% | 245 | 280 | 300 | 960 | 42 | 50.4 | 56 | 7.9 | 69 |
| 6 | 70% 30% | 240 | 280 | 300 | 960 | 42 | 50.4 | 50 | 3.2 | 67 |
| 7 | 75% 25% | 240 | 280 | 300 | 960 | 42 | 50.4 | 58 | 3.0 | 66 |
| 8 | 80% 20% | 240 | 280 | 300 | 960 | 42 | 50.4 | 55 | 3.2 | 65 |

EXAMPLE 9

This example describes the extrusion blowing of a block copolymer COPET/PLC. This block copolymer was prepared under the conditions of example 2 but using 15% by weight of polycaprolactone (PLC) instead of PBT.

The following table gives the blowing conditions and the results obtained.

| RESIN | BARREL/HEAD/DIE TEMP. °C. | BOTTLE/HOUR N° | BOTTLE WEIGHT gr | OUTPUT Kg/h | SCREW SPEED rpm | ACA ppm | DROP TEST cm |
|---|---|---|---|---|---|---|---|
| | 230 270 280 960 | 960 | 42 | 50.4 | 50 | 3.06 | 58 |

EXAMPLES 10–12

These examples describe the extrusion blowing of a block copolymer COPET/PET 70/30 prepared according to example 1 and blended, before blowing, with 3.5% by weight of PBT (IV=1.220 dl/g) example 10; with 5% by weight of polycarbonate (PC), example 11; with 5% by weight of phenoxy resin, example 12.

The mixture was then dried and blowed according to the general procedure of comparative example 2.

The PET resin was a product of General Electric; PC was a Dow Chem. product and the phenoxy resin was an Union Carbide product.

The following table gives the blowing conditions and the results obtained.

| RESIN OF EXAMPLE | BARREL/HEAD/DIE TEMP °C. | BOTTLE HOURS N° | BOTTLE WEIGHT gr | OUTPUT Kg/h | SCREW SPEED rpm | ACA ppm | DROP TEST cm |
|---|---|---|---|---|---|---|---|
| 10 | 240 280 300 | 960 | 42 | 50.4 | 52 | 3.7 | 70 |
| 11 | 240 290 300 | 960 | 42 | 50.4 | 52 | 3.7 | 70 |
| 12 | 240 280 300 | 960 | 42 | 50.4 | 52 | 3.7 | 69 |

I claim:

1. A composition of polyester resins comprising block copolymers of the formula X—A—Y wherein X and Y are different polyester block selected from the group consisting of polyethyleneterephthalate, polybutyleneterephthalate, and copolyethyleneterephthalate containing up to 20% by weight of units from isophthalic acid and polycaprolactone, and wherein A is bivalent radical formed from a dianhydride of a tetracarboxylic acid by an addition reaction with the terminal OH and/or COOH groups of the polyalkyleneterephthalate resin, said composition being obtained by a process comprising (a) blending in the molten state two different polyalkalkyleneterphthalates in the presence of a dianhydride of a tetracarboxylic acid, (b) pelletizing the molten product and (c) subjecting the granules to an upgrading reaction in the solid state at temperatures from 100° to 220° C.

2. A composition according to claim 1 wherein the dianhydride is pyromellitic dianhydride.

3. A composition according to claim 1 wherein the dianhydride is used in amounts from 0.05 to 1% by weight.

4. A composition according to claim 3 containing up to about 20% by weight of a polymer selected from the group consisting of polybutyleneterephthalate, polycarbonate and a phenoxy resin.

5. A composition of polyester resins comprising block copolymers of the formula X—A—Y wherein X and Y are different polyalkyleneterphthalate blocks selected from the group consisting of polyethyleneterephthalate, polybutyleneterephthalate, polycaprolactone and copolyethyleneterephthalates containing up to 20% by weight of units from isophthalic acid, and wherein A is a bivalent radical from a dianhydride of a tetracarboxylic acid by an addition reaction with the terminal OH and/or COOH groups of the polyalkyleneterephthalate resins.

6. A composition according to claim 5 wherein A is a pyromellitic dianhydride.

7. A composition according to claims 1, 2, or 5 containing up to about 20% by weight of a polymer selected from the group consisting of polybutyleneterephthalate, polycarbonate and a phenoxy resin.

* * * * *

UNITED STATES PATENT AND TRADEMARK OFFICE
CERTIFICATE OF CORRECTION

PATENT NO. : 5,374,690
DATED : December 20, 1994
INVENTOR(S) : Al Ghatta

It is certified that error appears in the above-indentified patent and that said Letters Patent is hereby corrected as shown below:

At column 5, line 10, change "below" to --blow--.

At column 6, delete the first paragraph and substitute therefor:

--These examples describe the extrusion blowing of block copolymer COPET/PET compositions of example 1.
The block copolymer compositions were dried and blowed according to the general description of comparative example 2.--

At claim 1, column 7, line 1, "block" should be --blocks--.

Signed and Sealed this

Eighteenth Day of April, 1995

Attest:

BRUCE LEHMAN

Attesting Officer

Commissioner of Patents and Trademarks